UNITED STATES PATENT OFFICE.

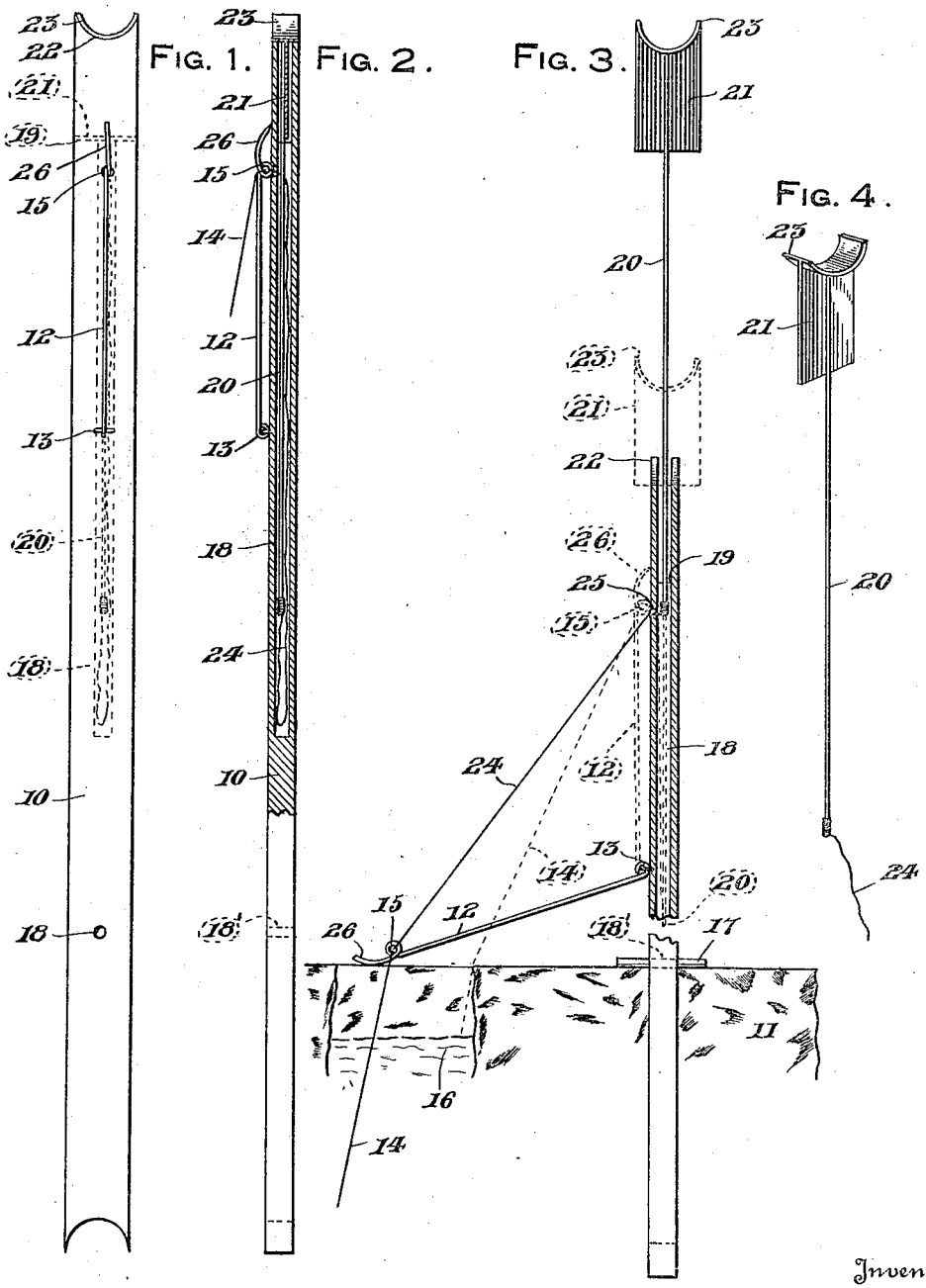
H. GAMPERT.
ICE FISHING DEVICE.
APPLICATION FILED MAY 18, 1918.
1,275,014.
Patented Aug. 6, 1918.

HENRY GAMPERT, OF FITCHBURG, MASSACHUSETTS.

ICE FISHING DEVICE.

1,275,014.  Specification of Letters Patent.  Patented Aug. 6, 1918.

Application filed May 10, 1918. Serial No. 233,704.

*To all whom it may concern:*

Be it known that I, HENRY GAMPERT, a citizen of the United States of America, residing at Fitchburg, in the county of Worcester and State of Massachusetts, have invented certain new and useful Improvements in Ice Fishing Devices, of which the following is a specification.

The primary object of the invention is to provide a device especially serviceable for fishing through the ice whereby the constant attention of the fisherman is unnecessary and a visible indication may be readily perceived from a distance whenever the fish are biting upon any line provided with my device.

A further object of the invention is the provision of means for anchoring a fish line and indicating when the fish are biting the bait upon the line, thereby enabling one person to care for a large number of fish lines without losing any fish that are caught thereby.

A still further object of the invention is the provision of a winding means for fish lines especially serviceable when fishing through the ice and arranged to visually denote when the fish are biting and also to furnish an indication when the bait has been tampered with or removed without catching the fish, the device being easy and inexpensive to manufacture.

In the drawing forming a part of this application and in which like numerals refer to corresponding parts throughout the several views, Figure 1 is a front elevation of the device in its normal arrangement;

Fig. 2 is a central longitudinal sectional view thereof;

Fig. 3 is a view of the device illustrated in its operative position indicating that a fish is on the line, the device being partially broken away and shown in longitudinal section while parts are indicated by dotted lines in the positions of the elements assumed when the bait has been removed without catching a fish; and Fig. 4 is a perspective view of the shiftable indicator forming a part of the device.

My device includes a post or stake 10 adapted for positioning upright in the ground by the side of the water or in the ice as indicated at 11 in Fig. 3 of the drawing while a support wire 12 in the nature of a fish pole is pivoted to the post 10 as at 13 for sustaining the fish line 14 connected to a loop 15 of the said support.

It will be understood that the fish line is positioned in the water as 16 through a hole in the ice 11 while a transverse pin 17 is preferably positioned through a perforation 18' of the post 10 for limiting the downward movement of the post in the ice 11.

A central bore 18 is provided in the post 10 terminating in a transverse slot 19 at the upper end of the post, a rod 20 being slidably mounted in the said bore having a colored strip 21 in the nature of a flag at its upper end adapted for seating within the slot 19 when the rod 20 is retracted in its normal lowered position. A curved seat 22 is provided at the upper end of the post 10 while the flag 21 has a correspondingly curved flange 23 at the upper end of the flag for fitting and resting upon the seat 22 when the rod 20 is lowered.

A cord 24 is secured to the lower free end of the rod 20 and passes through a perforation 25 in the side of the post 10 for attachment to the aforementioned loop 15 of the fish line support 12. From this detailed description of the device it will be understood that when the rod 20 is lowered within the bore 18 with the flange 23 resting upon the seat 22, the flag 21 will be invisible from its position within the slot 19 while the fish line support 12 will be in its normal elevated position with the loop 15 thereof positioned adjacent the perforation 25 and with the free end 26 of the support 12 engaging the side of the post 10.

The tugging of a fish upon the line 14 lowers the support 12, swinging the same upon its pivot 13, which results in elevating the rod 20 and bringing the colored flag 21 out of the slot 19 so as to be plainly visible by the fisherman in charge of the device although he may be positioned at a considerable distance therefrom. Any pulling upon the fish line 14 will tend to upwardly move the rod 20 and flag 21 so that the fisherman will be kept accurately advised as to the fishing conditions incident to the said line 14 and may take care of the same accordingly. A pulling upon the line 14 such as occasioned when a fish is caught upon the line, will maintain the flag 21 elevated but in such an event as escape of the fish, the rod 20 will lower by reason of its own weight and that of the flag 21 and the latter will in many instances rest upon the seat 22 transversely thereof as indicated by dotted lines in Fig. 3. This position of the flag 21 will denote to the fisherman that there has been a biting of the fish upon the line 14 but that the biting has ceased and under which conditions it is advisable to determine the condition of the bait upon said fish line 14. It will be seen that when the rod 20 is in its uppermost position, the lower end thereof is positioned substantially inwardly of the perforation 25 at a point below the bottom of the slot 19 so that the portion of the rod still remaining within the bore 18 prevents the rod 20 and flag 21 from any lateral movement or falling over.

When the rod 20 is elevated for projecting the flag 21 above the slot 19, the wind will readily revolve the said rod and flag by blowing against the flag 21 and this tendency of the flag to change its position relatively of the slot 19, as well as the contracted form of said slot renders it probable that the flag will assume a transverse position upon the seat 22 whenever elevated and then permitted to freely drop downwardly. Positive means are also preferably employed for insuring a partial rotation of the flag 21 when being projected which consists of winding the cord 24 slightly around the rod 20 so that during the upward movement of the rod a slight rotary movement will be imparted thereto after the flag 21 leaves the slot 19 and thereby substantially insuring the position of the flag transversely upon the seat 22 when the flag and rod fall downwardly such as during the escape of the fish with the bait. A serviceable fish line tender is provided adapted for general use and permitting the intelligent manipulation of a plurality of lines by a single attendant.

The support 12 may be of sufficient weight, if desired, to retain the flag 21 at its extreme upward limit of travel whenever the rod 20 is elevated and until the rod 20 and flag 21 are forcibly depressed by the attendant in charge of the same.

In operation, the post 10 is directed into the ice 11 until the pin 17 engages the upper surface thereof as shown in Fig. 3 and the several movable parts are positioned as shown in Figs. 1 and 2 with the fishing line 14 extending downwardly through the ice as shown in Fig. 3. Upon pulling of the line 14 occasioned by the biting of a fish, the member 12 is pulled downwardly to full line position in Fig. 3 from the dotted line position therein, at which time the cord 24 is also pulled by being connected to the member 12. This pulling of the cord 24 causes an upward sliding movement of rod 20 to a position shown by full lines in Fig. 3 so that the signal flag 21 is readily noted by the fisherman who is advised thereby that the line needs attention.

What I claim as new is:—

1. A fishing device comprising a chambered post adapted for upright positioning, a flag reciprocally carried by the said post normally positioned in the chamber of the latter and adapted for automatic elevating to a visible position upon the biting of the fish, and means to operatively connect said flag to a fish line.

2. In combination with a post having a longitudinal bore terminating in a slot in one end of the post, a rod slidably positioned within the bore, a flag upon the outer end of said rod normally within the said slot, a fish line support upon the post, and operative connections between the said support and the inner end of the rod whereby the flag is elevated to a visible position when the fish line is pulled.

3. In combination with a post having a longitudinal bore terminating in a slot in one end of the post, a rod slidably positioned within the bore, a flag upon the outer end of said rod normally within the said slot, a fish line support upon the post, operative connections between the said support and the inner end of the rod whereby the flag is elevated to a visible position when the fish line is pulled, the upper end of the post having a curved seat at the mouth of said slot, a flange upon the upper end of the flag normally positioned upon said seat when the flag and rod are in their lowered positions, and means whereby said rod is adapted for rotation when projected permitting the flag to rest transversely upon said seat upon lowering during the retraction of the rod.

4. A fishing device comprising a post adapted for upright positioning and having a longitudinal bore terminating in a transverse slot at the upper end of the post and with a perforation through the side of the post communicating with said bore, a support pivoted to the post beneath said perforation with a loop adjacent its free end, a rod slidably arranged in said bore, a cord wound around the rod and attached thereto extending through said perforation and connected to said loop, a fish line attached to the support at said loop, and a flag upon the upper end of the rod positioned within said slot when the device is in its normal arrangement.

5. A fishing device comprising a post adapted for upright positioning and having a longitudinal bore terminating in a transverse slot at the upper end of the post and with a perforation through the side of the post communicating with said bore, a support pivoted to the post beneath said perforation with a loop adjacent its free end, a rod slidably arranged in said bore, a cord wound around the rod and attached thereto extending through said perforation and connected to said loop, a fish line attached to the support at said loop, a flag upon the upper end of the rod positioned within said slot when the device is in its normal arrangement, the upper end of the post at the opposite sides of the slot being curved forming a seat, a curved flange upon the upper end of the flag adapted for resting upon the said seat when the flag is in its retracted invisible position, a transverse positioning pin carried by the post, the said perforation being arranged beneath the level of the bottom of the slot, and the said loop being positioned adjacent said perforation when the support is in its normal upper position contacting the post.

6. A fishing device comprising a post adapted for upright arrangement adjacent the water, a vertically movable rod carried by the post, a support hinged to the post, a fish line attached to the support adapted for positioning in the water, cord connections between the said rod and support whereby the rod is adapted for upward and turning movements during a downward pulling of the fish line, and a colored flag upon the upper end of the rod.

7. A fishing device comprising a post adapted for upright arrangement adjacent the water, a vertically movable rod carried by the post, a support hinged to the post, a fish line attached to the support adapted for positioning in the water, cord connections between the said rod and support whereby the rod is adapted for upward and turning movements during a downward pulling of the fish line, a colored flag upon the upper end of the rod, the said post having a slot adapted for the reception of said flag when the rod is retracted with the support in its normal idle position, the upper end of the post having a curved seat adapted for transverse engagement by the flag upon the lowering thereof when the fish line is released.

In testimony whereof I affix my signature.

HENRY GAMPERT.

Copies of this patent may be obtained for five cents each, by addressing the "Commissioner of Patents, Washington, D. C."